(12) United States Patent
Kawakami et al.

(10) Patent No.: US 7,461,277 B2
(45) Date of Patent: Dec. 2, 2008

(54) IMAGE FORMING DEVICE, POWER SUPPLY CONTROL DEVICE

(75) Inventors: Masaaki Kawakami, Yamatokoriyama (JP); Toshinori Tsujii, Yamatokoriyama (JP); Mikiya Okada, Nara (JP); Tsutomu Itai, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 439 days.

(21) Appl. No.: 10/988,112

(22) Filed: Nov. 12, 2004

(65) Prior Publication Data

US 2005/0108584 A1 May 19, 2005

(30) Foreign Application Priority Data

Nov. 13, 2003 (JP) ............................. 2003-384126

(51) Int. Cl.
*G06F 1/26* (2006.01)
(52) U.S. Cl. ...................................... 713/310; 713/300
(58) Field of Classification Search ................ 713/300, 713/310
See application file for complete search history.

(56) References Cited

U.S. PATENT DOCUMENTS

| | | | |
|---|---|---|---|
| 5,708,821 A | | 1/1998 | Takikita |
| 5,832,190 A | * | 11/1998 | Terajima et al. ............ 358/1.14 |
| 5,877,869 A | * | 3/1999 | Tachibana ................... 358/437 |
| 5,933,581 A | * | 8/1999 | Miyazaki et al. ........... 358/1.14 |
| 6,072,595 A | * | 6/2000 | Yoshiura et al. ............. 358/400 |
| 6,851,012 B2 | * | 2/2005 | Yamashima ................. 711/101 |
| 7,057,754 B1 | * | 6/2006 | Tsuchiya et al. ........... 358/1.15 |
| 2005/0094180 A1 | | 5/2005 | Nishimoto et al. |

FOREIGN PATENT DOCUMENTS

| | | |
|---|---|---|
| JP | 2000-032081 | 1/2000 |
| JP | 2001-094693 | 4/2001 |
| JP | 2001-103192 | 4/2001 |
| JP | 2003-228444 | 8/2003 |
| JP | 2004-005029 | 1/2004 |

* cited by examiner

*Primary Examiner*—Tse Chen
(74) *Attorney, Agent, or Firm*—David G. Conlin; Steven M. Jensen; Edwards Angell Palmer & Dodge LLP

(57) ABSTRACT

The subject invention provides an image forming device including a main control section and a signal detection circuit for detecting presence or absence of an external signal supplied to the main control section, and further provided with an interface section for controlling external communication; a main power supply circuit; a power supply control circuit. The signal detection circuit includes a low power mode prohibition circuit for outputting a low power mode prohibition signal for voiding the request for low power consumption with respect to the power supply control circuit or the main power supply circuit while the external signal is supplied to the signal detection circuit. With this arrangement, the present invention provides an image forming device capable of appropriate transition into the low power consumption operation by hardware without use of software.

5 Claims, 14 Drawing Sheets

TONE RING DETECTION CIRCUIT

OPEN COLLECTOR

1284 CIRCUIT

IMAGE FORMING DEVICE, POWER SUPPLY CONTROL DEVICE

This Nonprovisional application claims priority under 35 U.S.C. § 119(a) on Patent Application No. 2003/384126 filed in Japan on Nov. 13, 2003, the entire contents of which are hereby incorporated by reference.

FIELD OF THE INVENTION

The present invention relates to a power supply control device for controlling power supply of the object device according to demand of power, and also relates to an image forming device that includes the power supply control device and performs image forming based on supplied image data.

BACKGROUND OF THE INVENTION

For an image forming device such as a printer or a photocopier, one of the major problems to be achieved is reduction of entire power consumption by further decreasing power consumed at the stand-by state. Therefore, some image forming devices adopt a power supply device that stops power supply from the main power source circuit at the standby state in terms of reduction of entire power consumption.

However, in some cases, the device in the standby state needs to be back to the general operation in response to an externally supplied signal. For example, a photocopier with a facsimile function needs to be ready for receipt of externally supplied Fax data etc. that is transmitted via a telephone line. Further, for example, a printer needs to be back to the general operation immediately in response to detection of image data supplied from a personal computer etc., so as to carry out image forming according to the image data.

Under such circumstances, some prior art documents disclose a computer system and a control method for realizing low power consumption by driving the device under a low power mode while allowing the device to be back to the general mode any time necessary (e.g. Japanese Laid-Open Patent Application Tokukai 2000-32081 (published on Jan. 28, 2000)). The computer system and the control method for low power consumption disclosed in Document 1 are realized by software that detects data communication condition of the system using an OS or the like, so as to prevent the system from shifting to the low power mode during the data communication mode.

However, in conventional techniques such as Document 1, the shift to the low-power mode is mainly prevented by software such as an OS, and therefore, the system is vulnerable to malfunction of the program constituting the software, thus failing to thoroughly ensure secure operation.

Further, due to the time taken to cause the CPU to enforce the program constituting the software, the operation speed may decrease.

SUMMARY OF THE INVENTION

The present invention is made to provide a power supply control device, and an image forming device including the power supply control device that are capable of appropriate transition into the low power consumption operation. The power supply control device and the image forming device of the present invention are realized by hardware, thus not depending on software.

The image forming device of the present invention comprises: a main control section that controls operation state of the device and outputs a request for low power consumption to change the operation state from a general operation mode to a low power operation mode; an interface section for controlling external communication with a detection circuit for detecting presence or absence of an external signal supplied to the main control section; a main power supply circuit for supplying power to the main control section only at operation under the general operation mode; a power supply control circuit for causing the main power supply circuit to be operated under a low power operation mode in response to the request for low power consumption supplied from the main control section; and a low power mode prohibition circuit for outputting a low power mode prohibition signal for voiding the request for low power consumption with respect to the power supply control circuit or the main power supply circuit while the external signal is supplied to the signal detection circuit.

In this structure, while communication is performed via a signal detection circuit, the request for low power consumption outputted from the main control section to the power supply control circuit is voided by the low power mode prohibition circuit. The voiding here means cessation of transition of the main power supply circuit and the auxiliary power circuit into the low power operation mode even when the request for low power consumption is outputted from the main control section.

Therefore, it is possible to prevent the device from being carelessly turned into the low power operation mode during the communication with external devices. Further, since the structure performs detection of signals and voiding of request for low power consumption by hardware, that are practical circuits, the voiding of the request for low power consumption is more securely and more quickly performed compared to the structure performing such a control with software.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5($a$) illustrates a circuit for detecting a FAX signal supplied via a public line as a start-up signal for driving the main power supply circuit. FIG. 5($b$) illustrates a circuit for detecting a signal supplied via an IEEE1284 interface or an USB interface as a start-up signal for driving the main power supply circuit.

FIG. 6($a$) illustrates an example the start-up is performed in response to identification by IEEE1284. FIG. 6($b$) illustrates an example the start-up is performed in response to identification by such as Ethernet®.

DESCRIPTION OF THE EMBODIMENTS

One embodiment of the present invention will be described below with reference to Figures. The following describes a multi-functional printer (MFP hereinafter) with a facsimile function, a scanner function, a printer function and a photocopier function.

Figure 1:
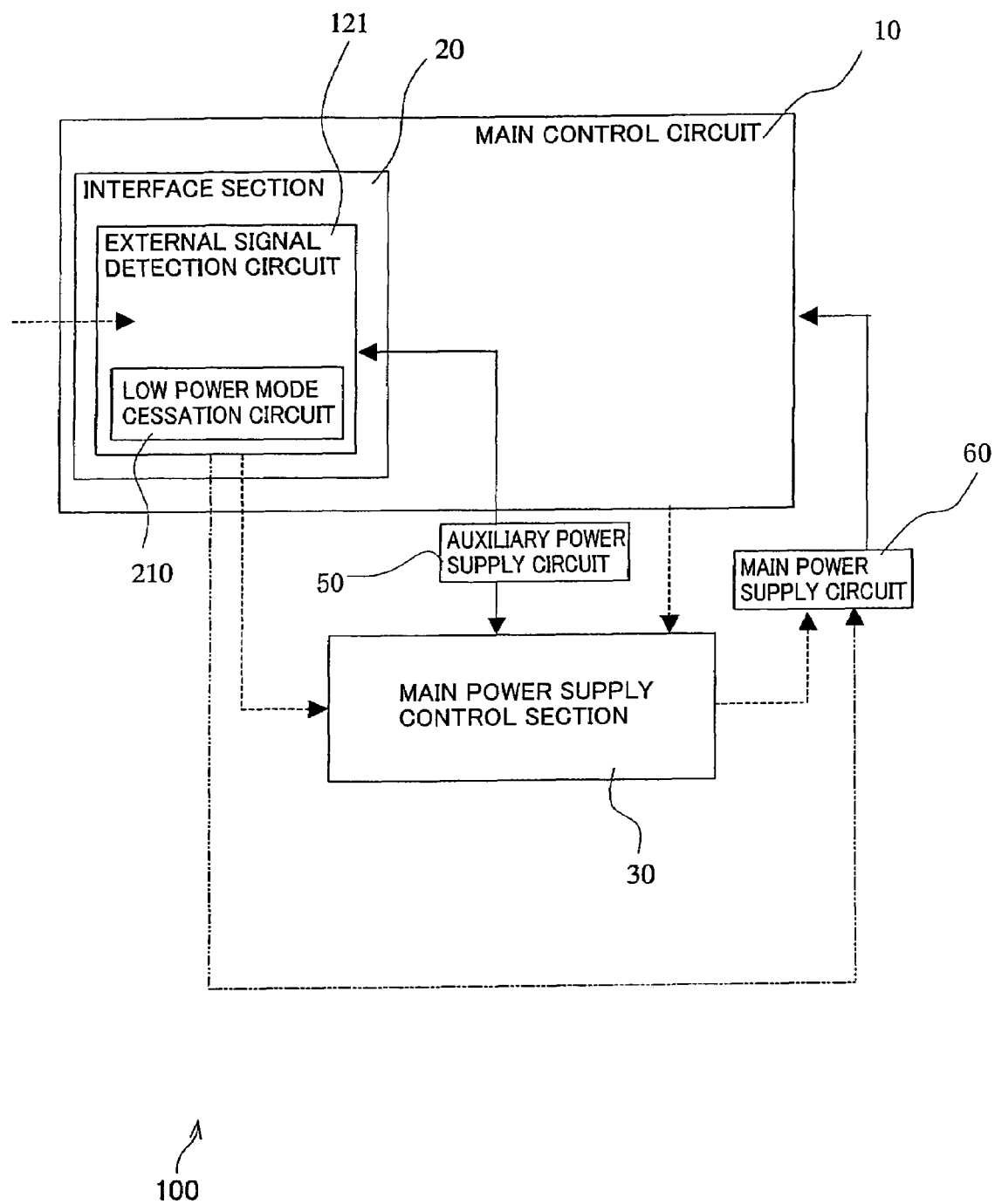
FIG. 1 is a block diagram schematically showing power supply circuits and various circuits connected thereto in an image forming device according to the present invention.

FIG. 1 is a block diagram schematically showing power supply circuits and various circuits connected thereto in the MFP as an image forming device according to the present invention. An image forming device of the present invention mainly includes a main control circuit 10, a main power supply circuit 60, an auxiliary power supply circuit 50, a main power supply control section 30, and an interface section 20.

A main control circuit 10 sets the operation mode of the device body to either a general operation mode or a low power operation mode. Further, the main control circuit 10 administrates the operations of the respective sections of the image forming device.

Upon general operation mode, the main power supply circuit 60 supplies power to the respective sections of the image forming device including the main control circuit 10.

The auxiliary power supply circuit 50 constantly supplies power to the external signal detection circuit 121 and the main power supply control section 30. This allows transition from the low power operation mode where the main power supply circuit 60 stops into the general operation mode where the main power supply circuit 60 drives.

The main power supply control section 30 is constituted of a group of circuits for controlling cessation/start-up of the main power supply circuit 60. The main power supply control section (power supply control section) 30 stops the main power supply circuit 60 in response to a request for low power consumption from the main control section 10. Meanwhile, the power supply control section 30 inputs a start-up signal to the main power supply circuit 60 when an external signal for the MFP 100 is supplied into the external signal detection circuit 121 so as to start the main power supply circuit 60.

The interface section 20 includes a main circuit for receiving power supplied from the main power supply circuit 60 and an external signal detection circuit 121 that is supplied from the auxiliary power supply circuit 50 and detects presence/absence of an external signal. The external signal detection circuit 121 includes a low power mode prohibition circuit 210. Note that, in FIG. 1, the external signal detection circuit 121 for detecting presence/absence of an external signal is provided in the interface section 20; however, it may be provided in the main power supply control section 30.

The low power mode prohibition circuit 210 serves to prevent the MFP from shifting to low power mode when the external signal detection circuit 121 senses a signal.

When changing the operation into the low power operation mode, the main control circuit 10 makes a request for low power consumption to the main power supply control section 30. Then, in response to the request for low power consumption, the main power supply control section 30 stops the operation of the main power supply circuit 60 and drives the MFP in low power mode. Meanwhile, when an external signal for the MFP 100 is supplied to the external signal detection circuit 121, the main power supply control section 30 restarts the main power supply circuit 60 to bring the MFP back in the general operation mode.

The present embodiment is characterized by having a function of preventing the MFP from shifting to the low power mode during the communication via the interface section 20. Particularly, the present invention uses hardware to prevent the MFP from shifting to the low power mode during the communication.

More specifically, the low power mode prohibition circuit 210 outputs a low power mode prohibition signal when the external signal detection circuit 121 detects a signal. The low power mode prohibition signal is either directly supplied to the main power supply circuit 60 from the low power mode prohibition circuit 210, as shown by the chain double-dashed line in the figure, or is supplied indirectly to the main power supply circuit from the low power mode prohibition circuit 210 via the power supply control section 30, as shown by the broken line in the figure.

In the arrangement in which the low power mode prohibition signal is directly supplied to the main power supply circuit 60, a signal for starting up the main power supply circuit 60 is preferably used as the low power mode prohibition signal. On the other hand, in the arrangement in which the low power mode prohibition signal is indirectly supplied to the main power supply circuit 60, it is preferably so arranged that a start-up signal is supplied to the main power supply circuit in response to the input of the low power mode prohibition signal. The operation of the present invention has been thus summarized, but the following more specifically describes the embodiments of the present invention with concrete examples.

EXAMPLE 1

Figure 2:
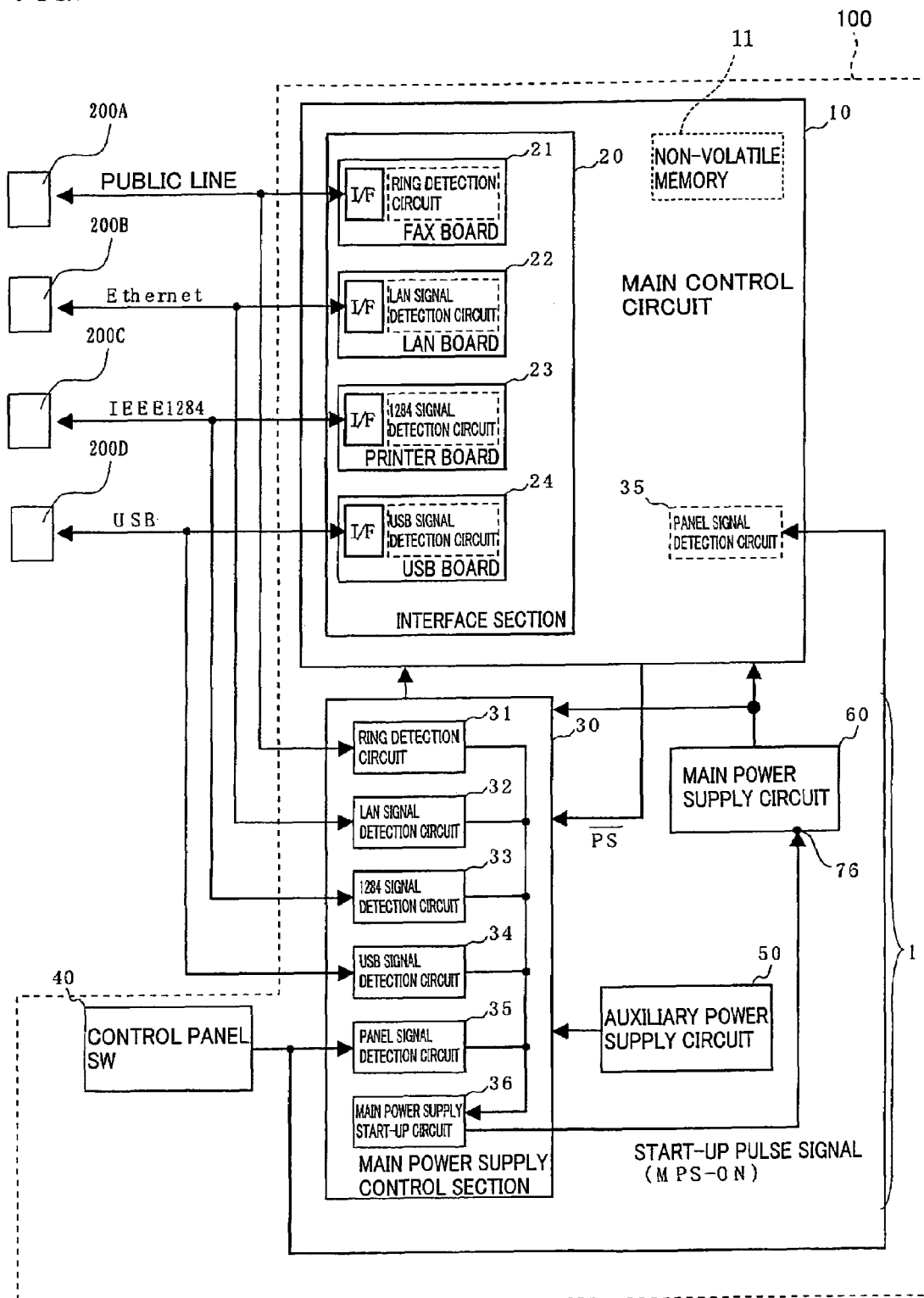
FIG. 2 is a drawing illustrating a structure of power supply circuit and communication system according to one embodiment of the present invention.

FIG. 2 schematically shows a structure of a communication system according to First Embodiment of the present invention. The communication system includes a MFP 100. As shown in the figure, the present example uses a communication system made up of a power supply device 1, external devices 200 (200A through 200D) and the MFP 100.

The MFP 100 (image forming device) includes a main control circuit 10, a power supply device 1, a control panel SW 40, and a non-volatile memory 11. Further, the power supply device 1 includes the main power supply control section 30, the auxiliary power supply circuit 50, and the main power supply circuit 60.

The main control circuit 10 constitutes the main control section of the MFP 100, and includes an interface section 20 for performing communication between the MFP 100 and the external devices 200 (200A through 200D). Further, the main control circuit 10 outputs a low level $\overline{PS}$ signal to the power supply control section 30 to stop the main power supply circuit 60.

The interface section 20 includes a FAX board 21, a LAN board 22, a printer board 23, and a USB board 24. The FAX board 21 is used for communication of FAX data that is inputted/outputted via public lines. The LAN board 22 is used for local area data communication via Ethernet® or the like. The printer board 23 is used for communication with external personal computers via the IEEE1284 interface. The USB board 24 is used for communication with USB devices such as a digital camera or an image storage device, via an USB interface.

The power supply control section 30 includes a power detection circuit, a ring detection circuit 31, a LAN signal detection circuit 32, a 1284 signal detection circuit 33, an USB signal detection circuit 34, a panel signal detection circuit 35 and a main power supply start-up circuit 36.

The ring detection circuit 31 detects the presence/absence of FAX data supplied from a public line. The LAN signal detection circuit 32 detects the presence/absence of data input in the local area supplied via Ethernet® or the like. The 1284 signal detection circuit 33 detects the presence/absence of a signal supplied from an external device 200C via the IEEE1284 interface. The USB signal detection circuit 34 detects the presence/absence of a signal supplied from an external device 200D via the USB interface. The panel signal detection circuit 35 detects whether or not the switch of the control panel SW40 is turned on by the user. The main power supply start-up circuit 36 starts up the main power supply circuit 60 according to the signals supplied from the respective detection circuits (31a through 35a).

The control panel switch (control panel SW hereinafter) 40 is a switch provided in an operation section that receives various commands etc. from the user. In the present example, the control panel SW40 is used to bring the MFP 100 in the low power mode back to the general operation mode on user's demand.

The auxiliary power supply circuit 50 functions to supply power to the ring detection circuit 31, the LAN signal detection circuit 32, the 1284 signal detection circuit 33, the USB signal detection circuit 34, the panel signal detection circuit 35 and the main power supply start-up circuit 36 during the low power operation mode, i.e., when the power supply from the main power supply circuit 60 is stopped. Note that, in the present example, each of the ring detection circuit 31, the LAN signal detection circuit 32, the 1284 signal detection circuit 33, the USB signal detection circuit 34, and the panel signal detection circuit 35 constitutes the signal detection circuit of the present invention.

The main power supply circuit 60 functions to supply a predefined power to the respective sections of the MFP 100 including the main control circuit 10. Here, in the MFP 100, when a certain time elapsed without any commands to be processed, that is, no commands are supplied from the user, the main control circuit 10 brings the device into the low power mode, so that power consumption at the standby state where the device is waiting for the next command is reduced. In this low power operation mode, no power is supplied from the main power supply circuit 60 to any section of the MFP 100 until the next command is inputted.

Further, in response to detection of the next command that is a start-up signal, the power supply device 1 is brought back to the general operation mode, and the power supply from the power supply circuit 60 to the respective sections of the MFP 100 including the main control circuit 10 starts again.

Figure 3:
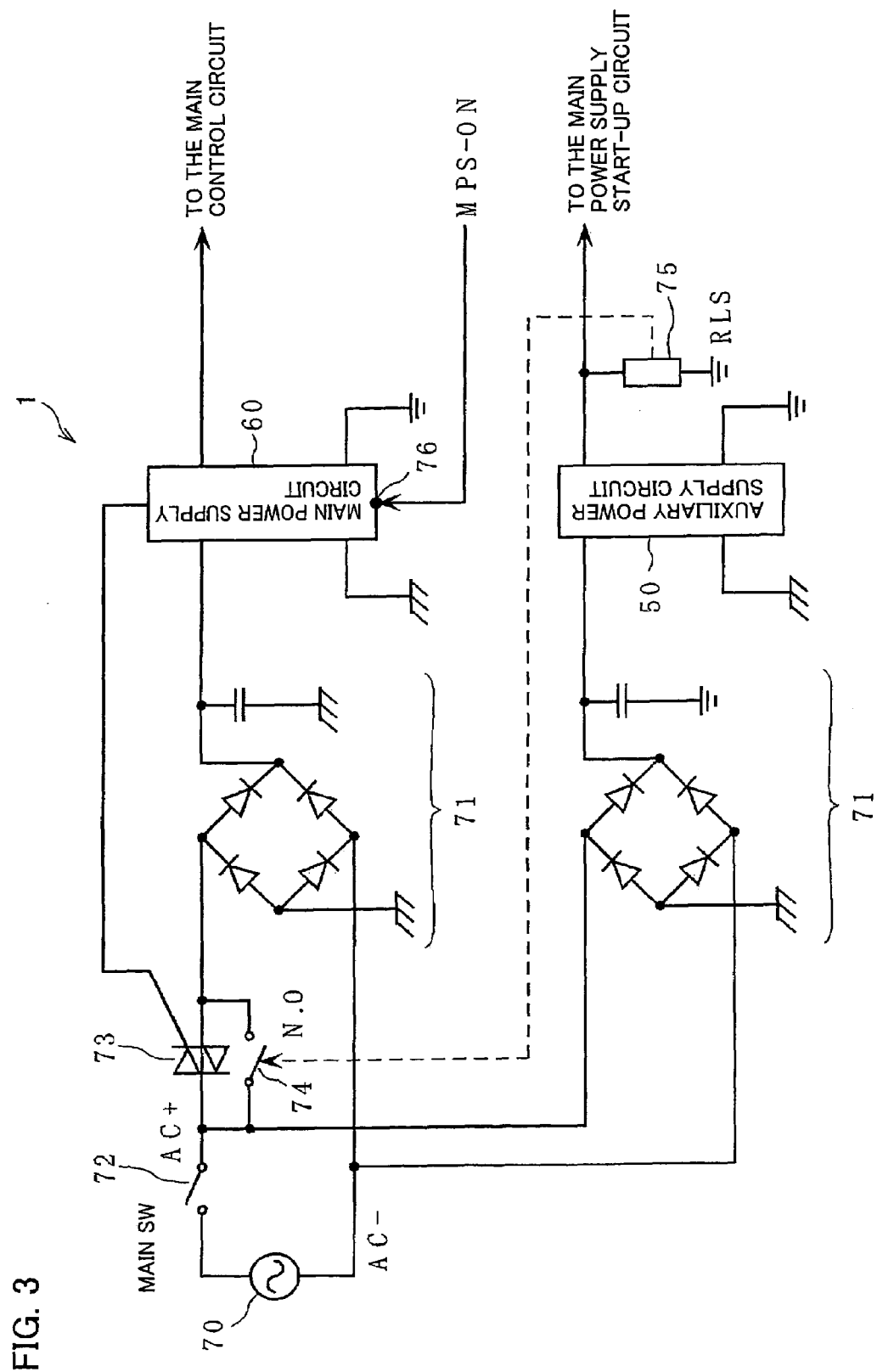
FIG. 3 is a circuit diagram illustrating a structure of a power supply device that is a component of the power supply circuit of FIG. 2.

FIG. 3 shows a structure of a main part of the power supply device 1. As shown in the figure, the power supply device 1 is supplied with a predefined power from a commercial power supply 70. Here, the main power supply circuit 60 and the auxiliary power supply circuit 50 are provided in parallel to each other while respectively connected to the commercial power supply 70. Further, a smoothing circuit is provided at each portion between the commercial power supply 70 and the main power supply circuit 60 and between the commercial power supply 70 and the auxiliary power supply circuit 50, so as to perform rectification/smoothing, respectively. Further, at the intermediate point of the commercial power supply 70 and the main power supply circuit 60, a main switch 72, a triac 73, and a normally-opened relay contact 74 are provided. The main power supply circuit 60 includes a MPS signal input terminal 76 for receiving input of a low level signal (MPS-ON signal) that turns on the main power supply circuit 60 and input of a high level signal (MPS-OFF signal) that turns off the main power supply circuit 60. Further, the auxiliary power supply circuit 50 is connected to a relay coil 75 that performs control of open/close of the relay contact 74.

In the structure of FIG. 3, when the main switch is turned on, the MFP 100 starts up; but the triac 73 is not conducted at this stage and the relay contact 74 is opened. Therefore, upon start up, power is supplied from the commercial power supply 70 to the auxiliary power supply circuit 50, thus bringing the auxiliary power supply circuit 50 into operation. Then, a current flows from the auxiliary power supply circuit 50 into the relay coil 75, and the relay contact 74 is closed, thus bringing the main power supply circuit 60 into operation. Upon this start-up of the main power supply circuit 60, the triac 73 is conducted, and connection between the commercial power supply 70 and the main power supply circuit 60 are maintained, thus bringing the power supply 1 into operation.

Figure 4:
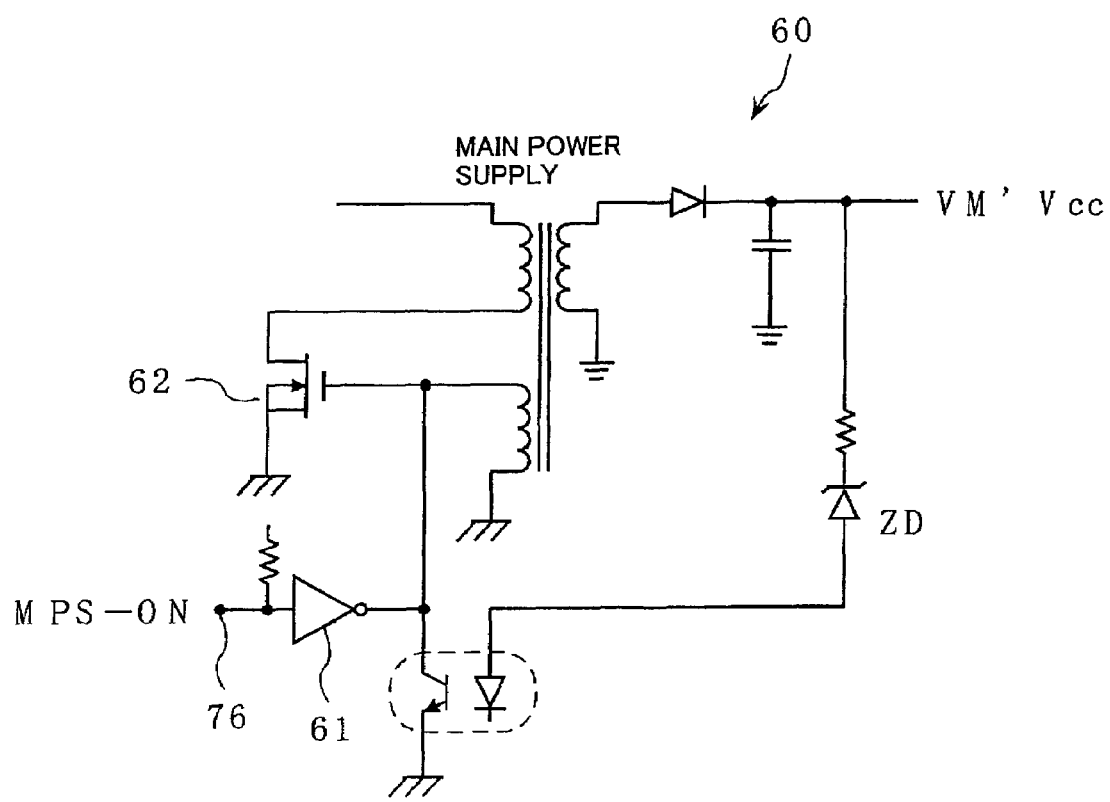
FIG. 4 is a circuit diagram illustrating a structure of a main part of the main power supply circuit of FIG. 3.

FIG. 4 shows a structure of the main power supply circuit 60. A MPS signal input terminal 76 of the main power supply circuit 60 is supplied with a MPS-ON signal or a MPS-OFF signal that are produced by the power supply control section 30. When the MPS-ON signal (low level) is supplied to the MPS signal input terminal 76, the output stage of an open collector inverter 61 becomes high in impedance, and the compulsory earthing of the gate of the switching transistor is released. As a result, a feedback signal supplied from a switching trans to the switching transistor 62 becomes effective and switching oscillation is carried out, thus bringing the main power supply circuit 60 into operation. On the other hand, when the MPS-OFF signal (high level) is supplied to the MPS signal input terminal 76, the switching transistor is compulsory earthed, and the main power supply circuit 60 is stopped.

For example, when a MPS-OFF signal is supplied to the MPS signal input terminal 76 in the general operation mode, the main power supply circuit 60 stops to cause the device to be turned into the low power operation mode. When the MFP receives no input of command etc. for or longer than a certain time under general circumstance, a $\overline{PS}$ signal is outputted from the main control circuit 10 to the power supply control section 30. Then, the main power supply start-up circuit 36 that has received the effective $\overline{PS}$ supplies the MPS-OFF signal to the MPS signal input terminal 76.

On the other hand, when a MPS-ON signal is supplied to the MPS signal input terminal 76 in the low power operation mode, the main power supply circuit 60 starts operation and the power supply device 1 is brought back in the general operation mode.

Figure 5:
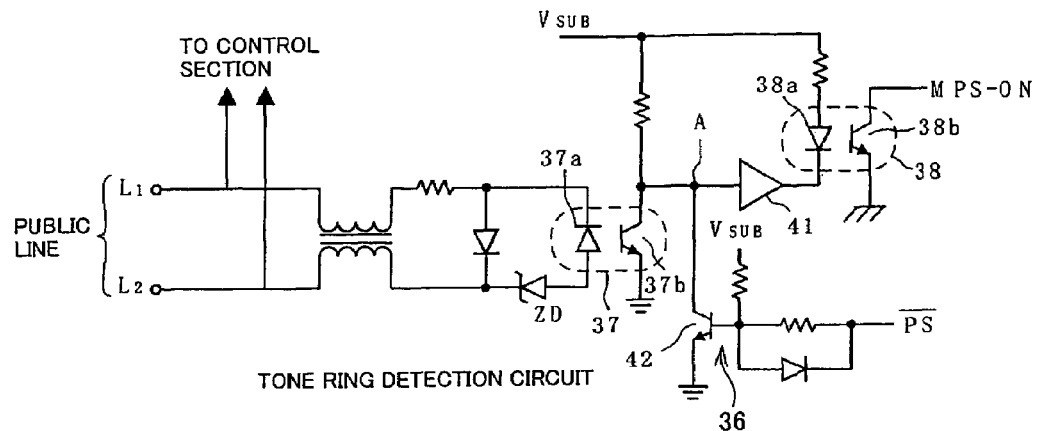
FIG. 5 is a drawing illustrating an example structure of a main power supply start up circuit that is a main part of a main power supply control section.
Figure 5:
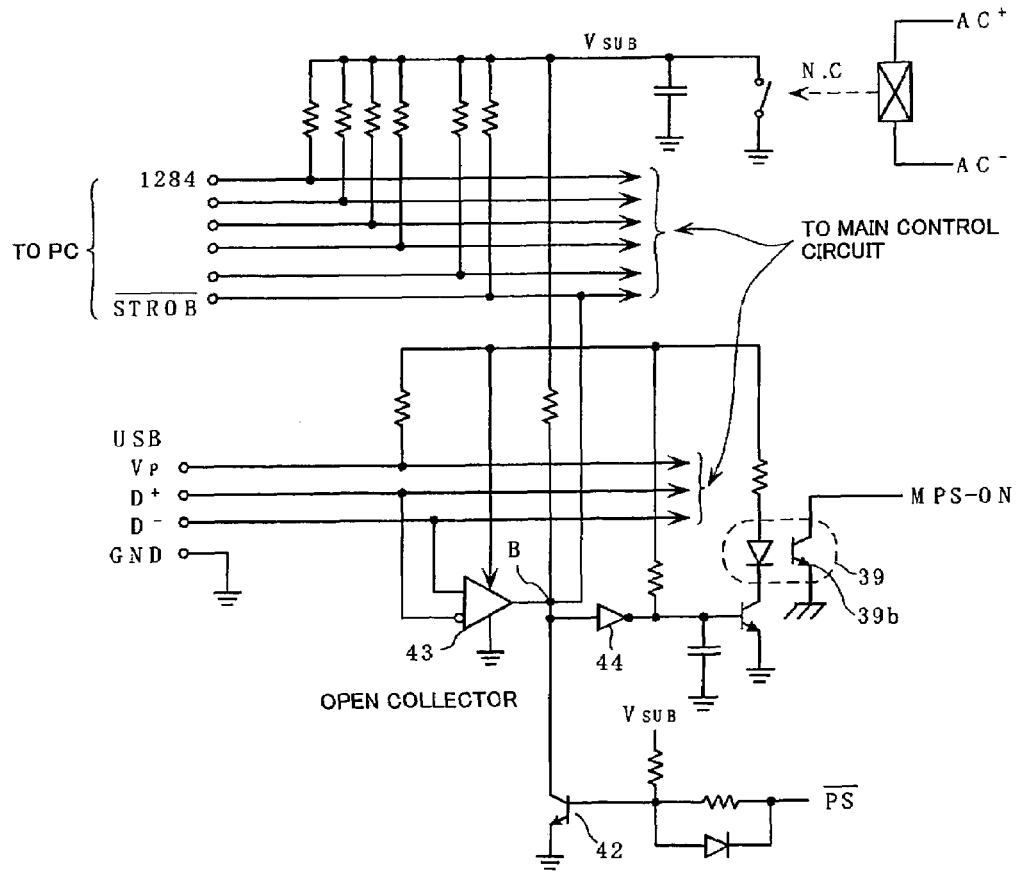

FIG. 5 shows structures of the signal detection circuit and the main power supply start-up circuit 36 according to the present example. FIG. 5(a) shows a circuit that detects a FAX signal supplied via a public line as the start-up signal to bring the main power supply circuit 60 into operation. Further, FIG. 5(b) shows a circuit that detects a signal supplied from the external device 200 via an IEEE1284 interface or a USB interface as the start-up signal to bring the main power supply circuit 60 into operation. Note that, FIG. 5(b) shows an example structure for supplying power from a power supply line of the USB interface to the recovering means.

First, to bring the main power supply circuit 60 into operation, a MPS-ON signal needs to be supplied; however, when the phototransistor 38b of the photocoupler 38 is not conducted, the effect of pull-up resistance of the input side of the open collector inverter 61 shown in FIG. 4 gives the same condition as when the MPS-OFF signal is supplied to the MPS signal input terminal 76.

Here, when the power supply device 1 is operated under the general operation mode, a potential VSUB of the auxiliary power supply circuit 50 is supplied to the base of the transistor 42, and the transistor 42 is conducted. Since the potential of the contact A in FIG. 5 becomes low level when the transistor 42 is conducted, the photodiode 38a is conducted, thus conducting the phototransistor 38b. As a result, the MPS-ON signal is supplied to the MPS signal input terminal 76, and the compulsory earthing for supplying a high level signal to the switching transistor 62 is released, thus bringing the main power supply circuit 60 into operation.

When the MFP 100 is operated under the low power operation mode, a low level $\overline{PS}$ signal is supplied to the base of the transistor 42 of the main power supply start up circuit 36 via a resistor, thus blocking conduction of the transistor 42. As a result, the potential of the contact A becomes high level, and the phototransistor 38b is brought out of conduction and supply of a MPS-ON signal to the MPS signal input terminal 76 stops. Therefore, the output stage of the inverter 61 becomes low level, and the gate of the switching transistor 62 is compulsory earthed, thus stopping operation of the main power supply circuit 60.

In this operation in the low power operation mode, a predetermined FAX tone ring signal is supplied from a public line as shown in FIG. 5(a), and the photodiode 37a of the photocoupler 37 detects the ring signal and establishes conduction of the phototransistor 37b. As a result, the potential of the contact A becomes low level, and the open collector buffer 41 is turned on, thus conducting the phototransistor 38b of the photocoupler 38. Accordingly, as with the case above, a MPS-ON signal is supplied to the MPS signal input terminal 76, and the main power supply circuit 60 is brought into operation, i.e., the device is brought back from the low power operation to the general mode operation.

In FIG. 5(b), an IEEE1284 signal or an USB signal is detected as the start-up signal. The process of bringing back the device from the low power mode to the general operation mode is the same in this case as that shown in FIG. 5(a).

The structure of FIG. 5(b) is characterized in that the power supplied from the power supply line VP of the USB interface is used to detect a start-up signal, when bringing the main power supply circuit 60 into operation.

As shown in the figure, the input of the $\overline{STROB}$ and the output of the open collector line buffer 43 are joined at the contact B and this merged output is supplied to the open collector inverter 44 as a wired-OR output, thus bringing the output transistor 39b of the photocoupler 39 into conduction. Here, the output transistor 39b of the photocoupler 39 and the output transistor 38b of the photocoupler 38 are joined as a wired-OR output, and therefore, when the output transistor 39b of the photocoupler 39 is conducted as in the case where the phototransistor 38b is conducted, a MPS-ON signal is again supplied to the MPS signal input terminal 76. As a result, the main power supply circuit 60 is brought back in operation, that is, the low power operation mode is turned into the general operation mode. Here, the power from the power supply line VP of the USB interface is used to detect the USB signal, to control the operation of the photocoupler 39 and some other purposes. Note that, the power supply does not necessarily have to be performed by the power supply line VP of the USB interface, but any interface having a power supply line may supply power according to circumstances. Further, if it is possible to supply power from a larger number of power supply lines without degrading the function of the interface, the power supply line of the interface may supply power also to other circuits which is supplied with power from the auxiliary power supply circuit 50.

Figure 6:
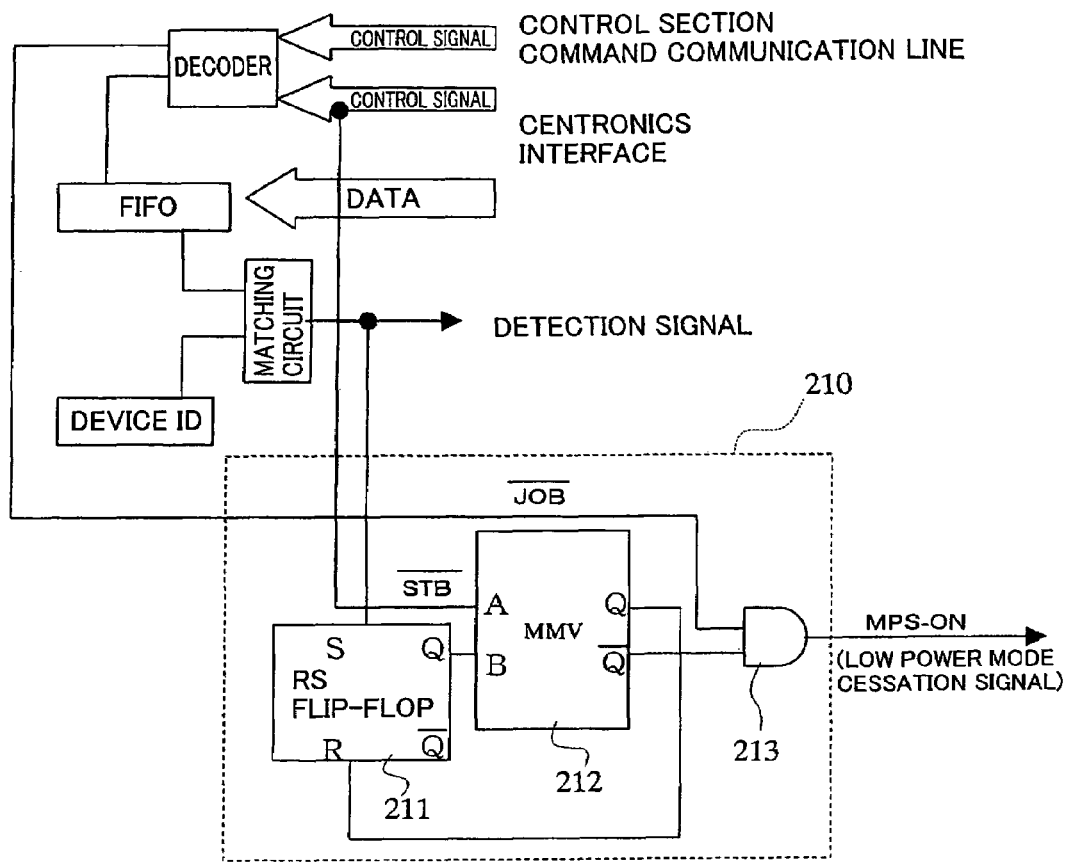
FIG. 6 is a drawing showing a structure example of the main power supply start-up circuit that is a main part of the main power supply control section of FIG. 2, in which the start-up is performed in response to identification of the corresponding device ID.
Figure 6:
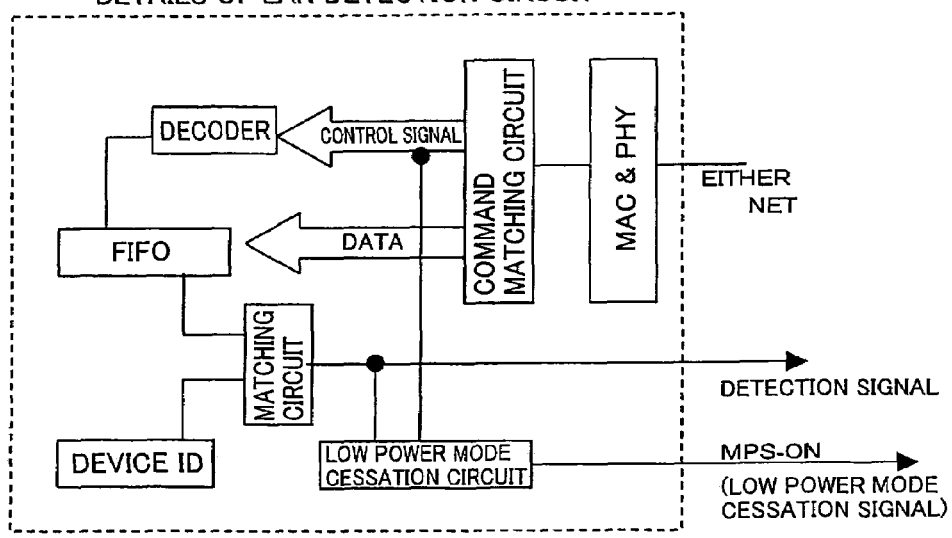

FIG. 6 shows an example of a start-up with identification of the corresponding ID. FIG. 6(a) shows a case of identification by IEEE1284, and FIG. 6(b) shows identification by Ethernet® or the like.

As shown in these figures, the identification performed by IEEE1284 or Ethernet° is simplified with such an arrangement that the start-up is allowed only when the device ID and the input data are matched.

Further, each of the ring detection circuit 31, the LAN signal detection circuit 32, the 1284 signal detection circuit 33, and the USB signal detection circuit 34 is provided with a low power mode prohibition circuit 210 shown in FIG. 6(a). Note that, FIG. 6(a) shows an example of the low power mode prohibition circuit 210 provided in the 1284 signal detection circuit 33.

The low power mode prohibition circuit 210 includes an RS flip-flop 211, a monostable multi-vibrator (MMV hereinafter) 212, and an AND circuit 213.

The RS flip-flop 211 includes an R input (reset), an S input (set), a Q output, and a $\overline{Q}$ output. The R input is connected to the Q output of the MMV 212. The S input (set) is connected to the output side of the matching circuit that identifies the device ID. The Q output is connected to the B input of the MMV 212. Note that, the Q output of the RS flip-flop 211 is supplied as a trigger to the B input of the MMV 212.

The MMV 212 includes a A input, a B input, a Q output, and a $\overline{Q}$ output. The MMV 212 carries out one-shot output when the input signal supplied to the A input falls from high to low. The MMV 212 carries out one-shot output when the input signal supplied to B input rises from low to high. The Q output outputs a high level signal upon one-shot output. The $\overline{Q}$ output is connected to the input side of the AND circuit 213, and outputs a low level signal upon one-shot output.

The AND circuit 213 includes two input terminals and one output terminal. As described, the one end of the input terminal is connected to the Q bar output of the MMV 212. Further, the other end of the input terminal is connected to a decoder provided in the 1284 detection circuit 33. Note that, the decoder analyzes a control signal supplied to the 1284 detection circuit 33.

The following explains operation of the low power mode prohibition circuit 210 with reference to FIG. 6(a). First, when a control signal is externally supplied to the decoder, the data is stored in FIFO, and the matching circuit carries out identification of the output and the device ID. When the ID is matched, a high level detection signal is outputted from the matching circuit.

The detection signal is supplied to the S input of RS flip-flop 211. When a detection signal is thus supplied to the S input of the RS flip-flop, a high level signal is outputted from the Q output of the RS flip-flop 211. As a result, the MMV 212 outputs a high level signal from the Q output, and outputs a low level signal from the $\overline{Q}$ output. Note that, the time for one-shot output of the MMV 212 is set to 5 seconds in the present example; however, the time is not limited to this, and an optimal value may be chosen according to usage condition of the MMV 212.

Upon one-shot output, a low level signal is supplied from the $\overline{Q}$ output of the MMV 212 to the AND circuit 213. Meanwhile, a high level signal outputted from the Q output of the MMV 212 is supplied to the R input of the RS flip-flop 211, and the RS flip-flop 211 is reset to be ready for the next start-up request.

Further, the AND circuit 213 outputs a high-level signal only when two of the input terminals are supplied with high level. In the present example, this high level signal is supplied to the main power supply circuit 60 as a MPS-ON signal from the AND circuit 213. Therefore, as long as the AND circuit 213 outputs a low-level signal, the main power supply circuit 60 is not turned into the low power operation mode.

In the structure of FIG. 6(*a*), as long as a low level $\overline{JOB}$ is outputted from the decoder in response to input of a control signal, or as long as the MMV 212 performs one-shot output, the AND circuit 213 will not output a high level signal.

Therefore, for at least 5 seconds after a signal is supplied to the 1284 detection circuit 33, the main power supply circuit 60 is not turned into the low power mode. Then, 5 seconds after the input of a signal to the 1284 detection circuit 33, a high-level signal is supplied to two of input terminals of the AND circuit 213, and the AND circuit 213 outputs a high level signal. In this way, it is possible to prevent the device from being left in the general operation mode for a long time after the communication is completed, thereby reducing power consumption.

Figure 7:
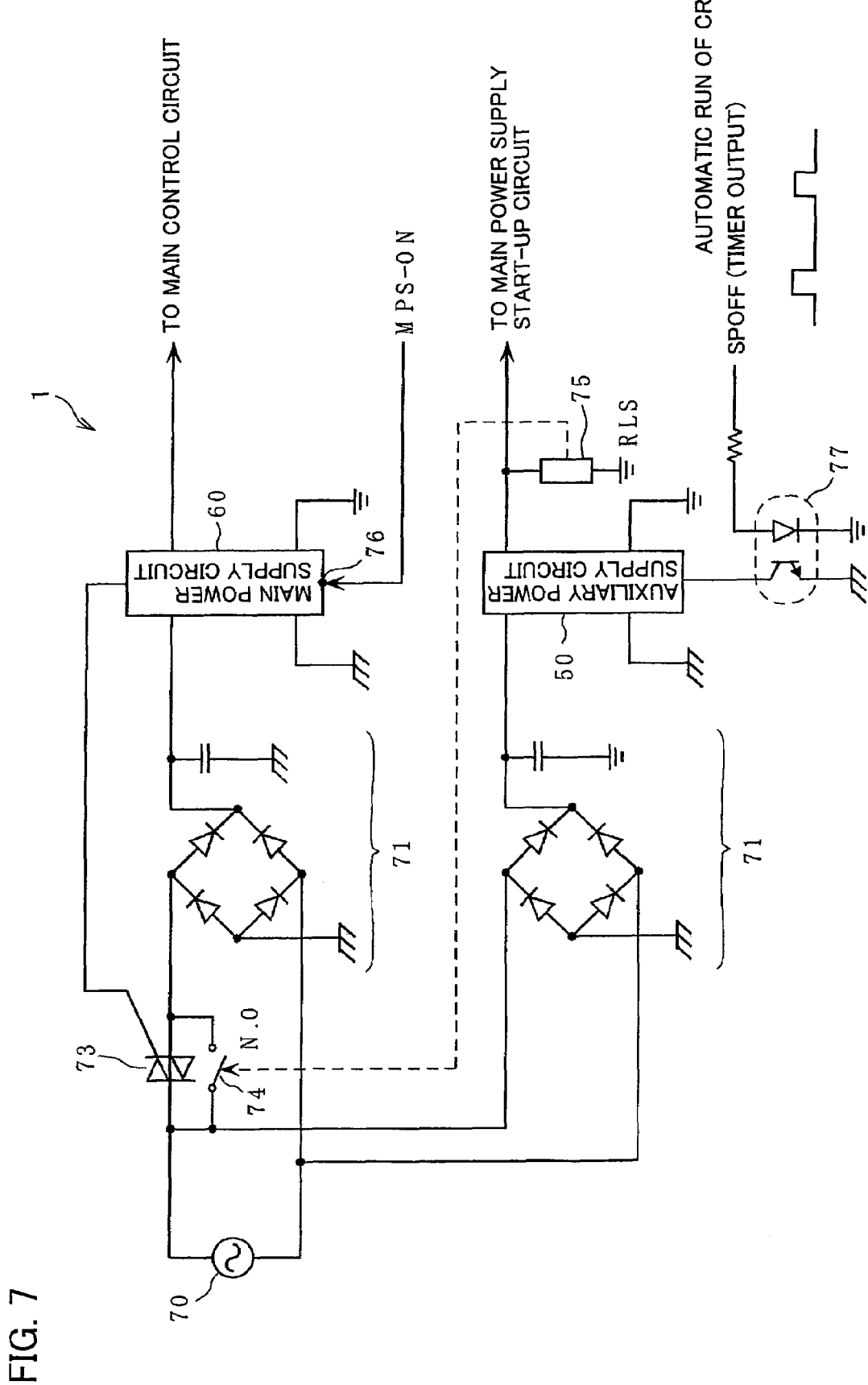
FIG. 7 is a drawing showing various structures of the power supply circuit according to one embodiment of the present invention.

FIG. 7 shows a example structure of the circuit used for power management of the auxiliary power supply circuit 50. As shown in the figure, in the auxiliary power supply circuit 50, a photocoupler 77 performs ON/OFF control of the auxiliary power supply circuit 50. Therefore, even when the low power operation mode continues for a while, the auxiliary power supply circuit 50 is supplied with power from the commercial power supply at predetermined intervals.

Therefore, even when a start-up signal is supplied after the low power mode continues for a while, it is possible to prevent failure of start-up of the main power supply circuit 60 due to shortage of power of the auxiliary power supply circuit 50, thereby securely bringing back the device in the general operation mode.

Figure 8:
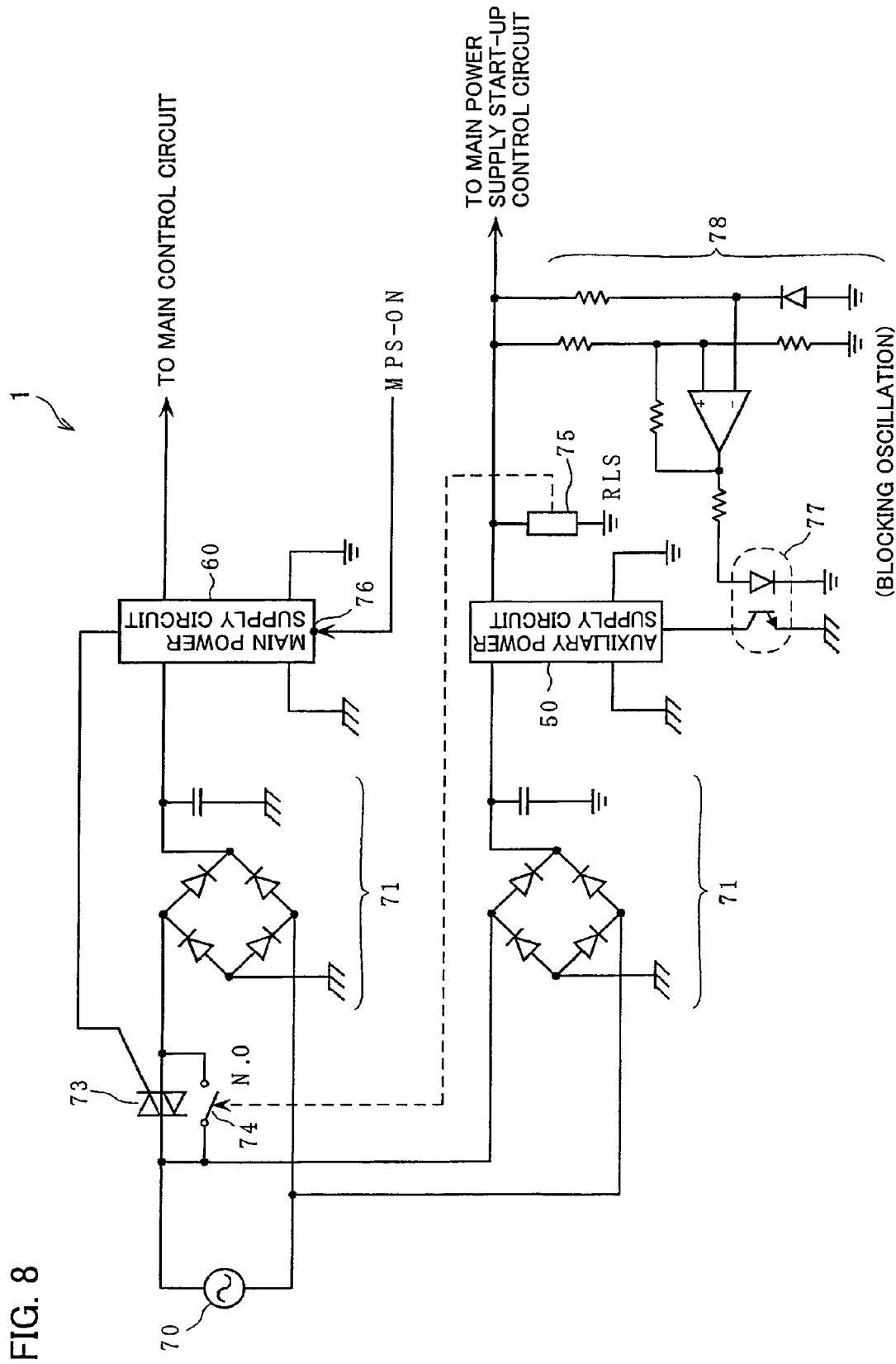
FIG. 8 is a drawing showing various structures of the power supply circuit according to one embodiment of the present invention.

Similarly to FIG. 7, FIG. 8 is a drawing showing an structure example of the circuit used for power management of the auxiliary power supply circuit 50. Here, as shown in the figure, the value of the voltage of the auxiliary power supply circuit 50 is monitored by the power supply voltage monitoring circuit 78. When the power supply voltage monitoring circuit 78 detects that the voltage of the auxiliary power supply circuit 50 falls below a predetermined value, the power supply voltage monitoring circuit 78 outputs a signal to the photocoupler 77 so that the auxiliary power supply circuit 50 is charged.

Note that, in this structure, power is supplied to the auxiliary power supply circuit 50 from the commercial power supply 70; however, it may be arranged so that power is supplied from a USB device or the like connected to the MFP 100, via an interface having a power supply line. Further, when it is arranged so that power is indirectly supplied to the auxiliary power supply circuit 50 as with the case above, it is possible to handle a long time low power operation mode, regardless the capacitance of the auxiliary power supply circuit 50.

EXAMPLE 2

Figure 9:
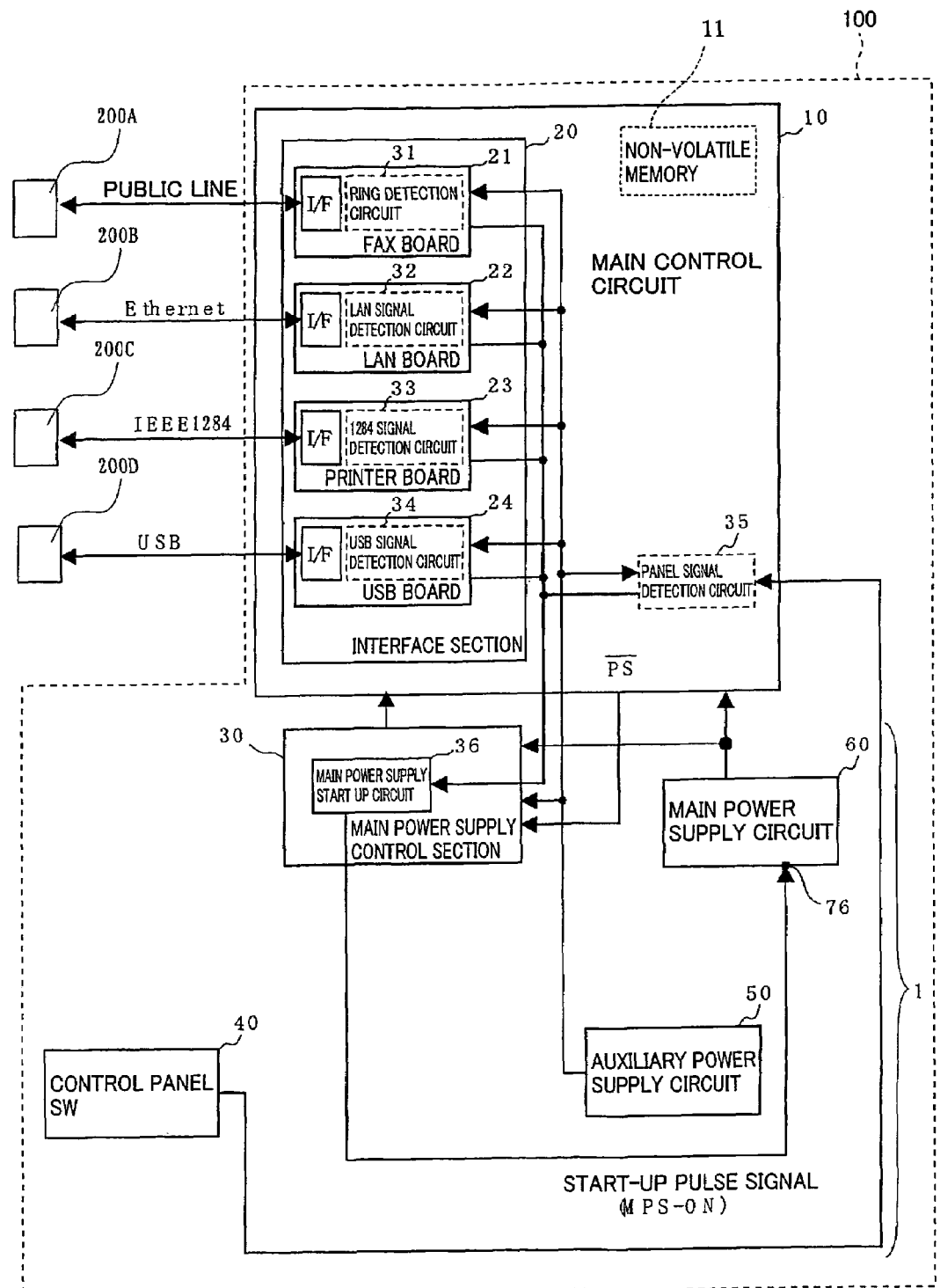
FIG. 9 is a drawing illustrating an arrangement of the power supply circuit and the communication system in an image forming device according to another embodiment of the present invention.

FIG. 9 shows a structure of the MFP 100 according to another example of the present example. In this example, the ring detection circuit 31, the LAN signal detection circuit 32, the 1284 signal detection circuit 33, and the USB signal detection circuit 34 are not separately provided dedicatedly for detecting a start-up signal; instead, the FAX board 21, the LAN board 22, the printer board 23, and the USB board 24 include the ring detection circuit 31, the LAN signal detection circuit 32, the 1284 signal detection circuit 33, and the USB signal detection circuit 24, respectively, and these circuits are used for detection of the start-up signal.

Here, the auxiliary power supply circuit 50 supplies power only to the ring detection circuit 31, the LAN signal detection circuit 32, the 1284 signal detection circuit 33, and the USB signal detection circuit 34. Note that, in the present example, the ring detection circuit 31 is electrically disconnected from other components of the FAX board 21 by switches or the like, and power to the other components is supplied from the main power supply circuit 60 after the main power supply circuit 60 is brought into operation. With this arrangement, the number of additional components can be reduced.

Further, in the communication system constituted of the MFP 100 and the external device 200 (200A through 200), the external device 200 transmits the same data to the MFP 100 plural times. This is because the MFP 100 uses the first supplied signal in the low power operation mode as a start-up signal to bring itself back in the general operation mode. More specifically, the first signal is used to bring the MFP 100 to be back in the general operation mode, and the second and later signals are regarded communication data. Accordingly, in consideration of the time taken to bring the MFP 100 back in the general operation mode, the external device 200 (200A through 200D) repeatedly transmits the same data to the MFP 100 until it receives a response from the MFP 100 that informs the receipt of data.

For consistence, the external device 200 (200A through 200D) does not regard such failures of transmission as communication error until the transmission has been repeated more than a predetermined times. With this function, the communication may be appropriately performed according to the characteristic of the MFP 100.

Note that, in the present invention, the wired interface used in the foregoing example of the communication system may instead be a wireless interface such as Bluetooth etc.

Further, the start-up signal is not limited to the signal from the external device 200 (200A through 200D) supplied via an interface, or the signal from the operation panel SW40, but may be a signal informing the insertion of a medium, such as a video disk, a memory stick etc., into the power supply device 1 used as a printer, a personal computer or other purposes.

EXAMPLE 3

Figure 10:
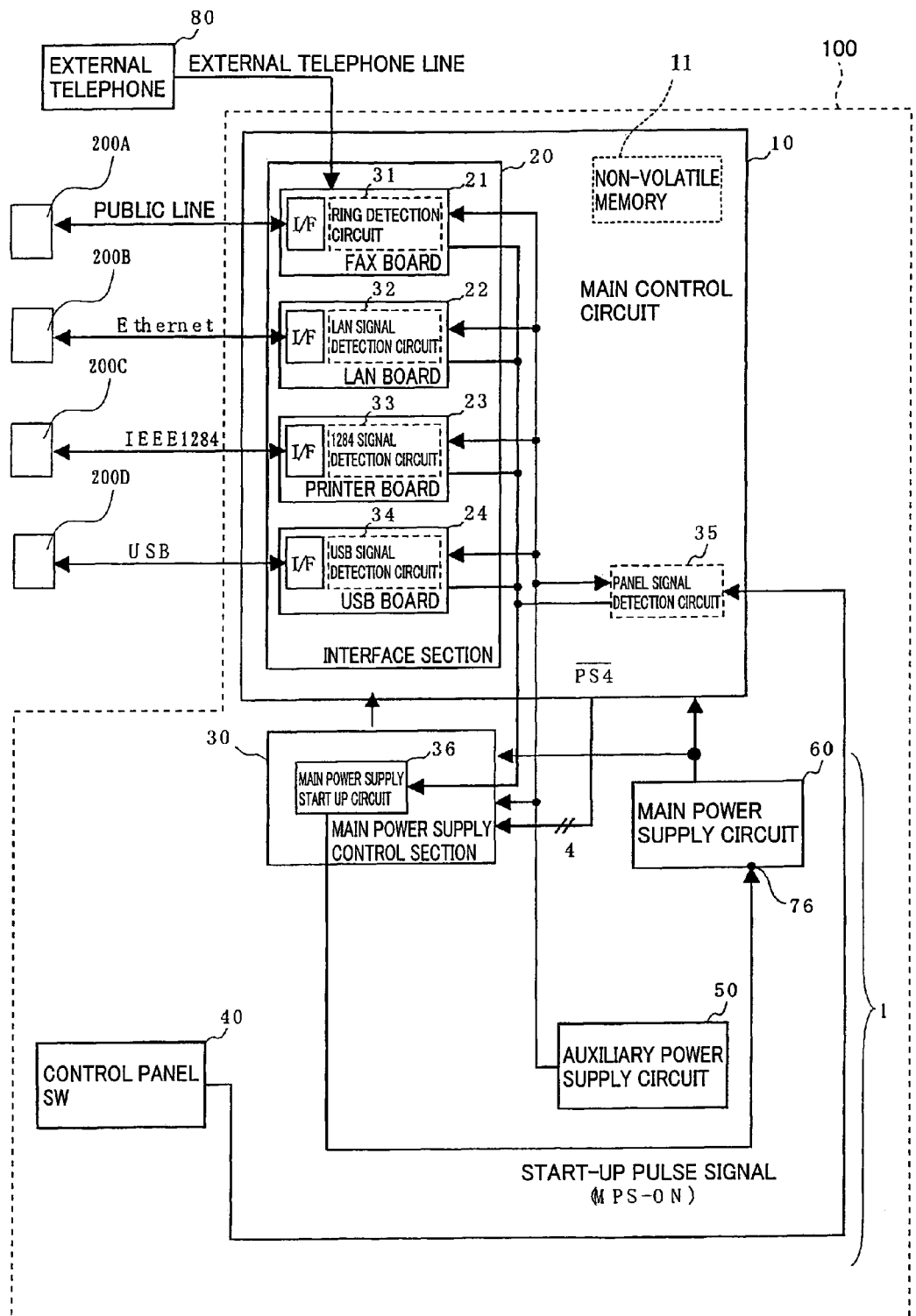
FIG. 10 is a drawing illustrating an arrangement of the power supply circuit and the communication system in an image forming device according to still another embodiment of the present invention.

FIG. 10 shows a structure of the power supply device 1 according to still another example of the present invention.

The structure of the power supply device 1 of the present example is basically the same as that of Example 2.

In First and Second Examples, when timing of the request for low power consumption ($\overline{PS}$), that is authorized by the main control circuit 10, differs from the timing of the random input of the request for start-up that is denoted by a signal via an interface section 20 by a certain degree, the MFP 100 may malfunction. Particularly, if the MFP 100 is turned into the low power operation mode when it is supposed to be in the general operation mode, the main power supply circuit 60 is stopped even when the data transmission/reception or other communication is required, thus failing of the communication. Therefore, the present example adopts a structure for appropriately preventing such a malfunction.

In the present example, the request for low power consumption ($\overline{PS}$) supplied to the main power supply control section 30 from the main control circuit 10 is converted into a 4-bit low power $\overline{PS4}$. When the $\overline{PS4}$ is matched with the predetermined pattern of request for low power consumption, the main power supply control section 30 produces a low level $\overline{PS}$ signal for the request for low power consumption. On the other hand, when the $\overline{PS4}$ is not matched with the predetermined pattern of request for low power consumption, the main power supply control section 30 produces a high level $\overline{PS}$ signal.

Figure 11:
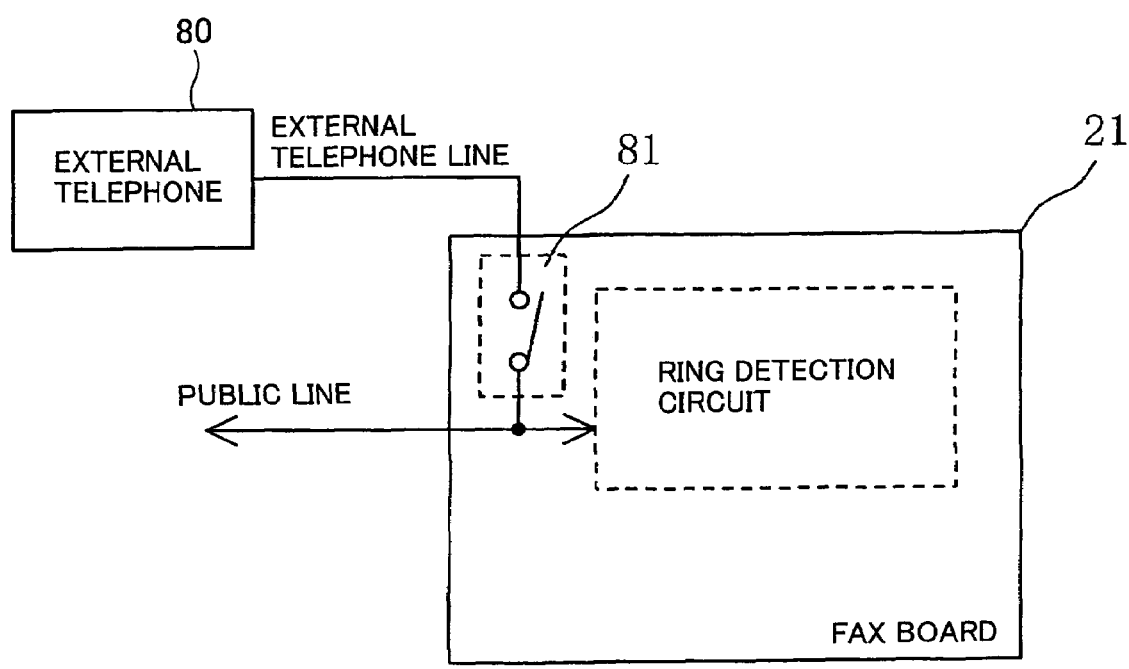
FIG. 11 is a drawing showing an arrangement of the FAX board of FIG. 10.

FIG. 11 shows a structure of the FAX board 21 connected to an external telephone 80 via a normally-closed (N.C.) relay contact 81 and a telephone line. In the power supply device 1 of the present example, if the signal regarding the request for low power consumption or request for start-up is recognized by sensing the signal edge, it may result in error detection when the noises are superimposed. To avoid such an error detection, in the present example, the request for low power consumption or the request for start-up is considered effective only when the request for start-up/cessation maintains for a predetermined period.

Figure 12:
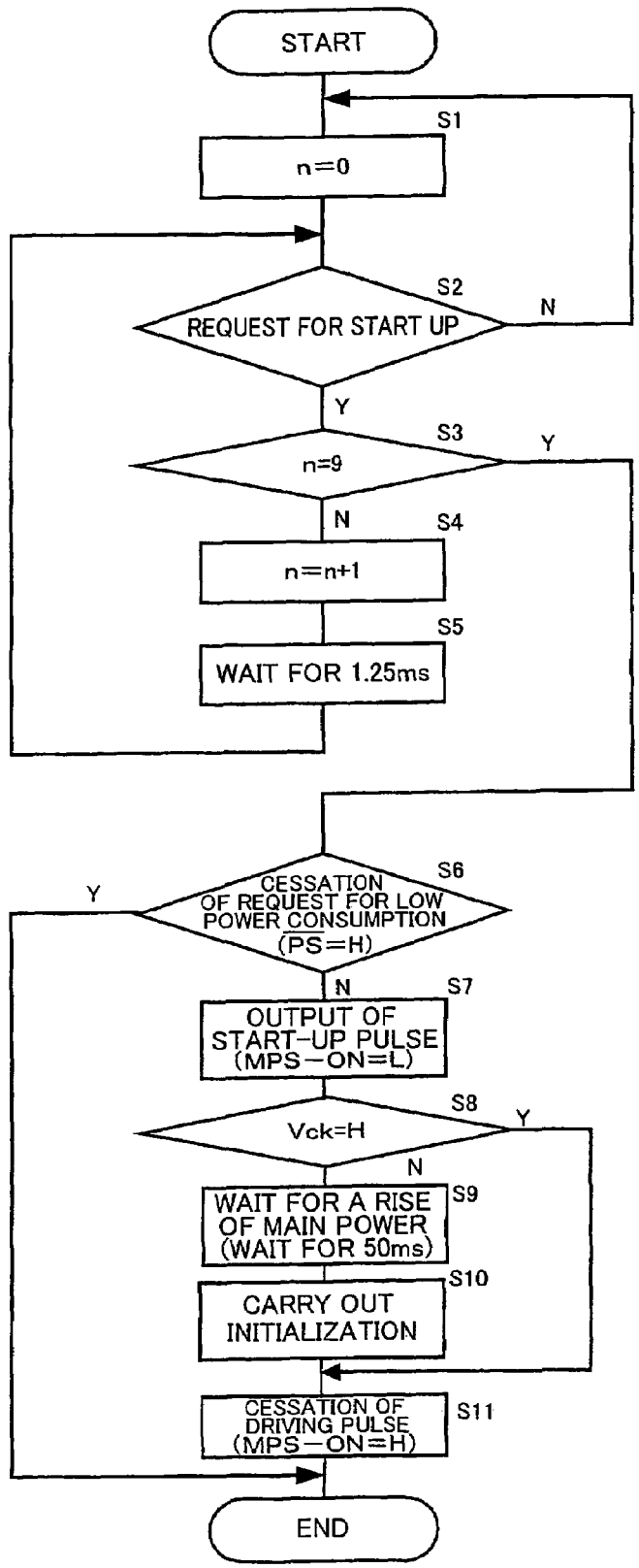
FIG. 12 is a flow chart showing operation procedure of the main power supply control section to turn the main control circuit into the general operation mode from the low power operation mode.

FIG. 12 is a flow chart of operation procedure to make a request for start up by the main power supply control section 30, according to the present example. Here, first of all, the main power supply control section 30 resets a variable for counting duration of the request for start up (counting value n) (S1). Then, the main power supply control section 30 stands by until the request for start up is made (S2).

When the request for start-up is made in S2 where the condition is suspended, the main power supply control section 30 carries out judgment as to whether or not the counting value (duration of the request) n has reached 9 (S3). Note that, in the present example, the counting interval is 1.25 ms.

Here, when the judgment in step S3 finds that the counting value n is less than 9, the main power supply control section 30 increments the counting value n by 1 (S4). Then, the main power supply control section 30 stands by for 1.25 ms (S5), and then judges whether or not the request for start up is made. (S2).

When the judgment in step S3 finds that the counting value n has already reached 9, another judgment is carried out as to whether or not the power supply device 1 is operated under the low power mode (S6). Here, if the request for low power consumption is cancelled (voided) and the power supply device 1 is back in the general operation mode, the main power supply control section 30 ends the start up operation. On the other hand, when the main power supply control section 30 judges in step S6 that the main power supply circuit 60 is stopped, the main power supply start up circuit 36 outputs a low level start up signal (MPS-ON signal) (S7).

Next, the main power supply control section 30 carries out detection as to whether or not a voltage of or greater than 3.5V is supplied from the main control circuit 10 to the main power supply circuit 60 using a power detection circuit provided therein. When a voltage of or greater than 3.5V is supplied to the main power supply circuit 60, the power detection circuit of the main power supply control section 30 outputs a high level Vck signal to the main control circuit 10. On the other hand, when a voltage less than 3.5V is supplied to the main power supply circuit 60, the power detection circuit of the main power supply control section 30 outputs a low level Vck signal to the main control circuit 10. Note that, the threshold value is not limited to 3.5V but may be increased or decreased according to usage condition.

Then, in the main power supply control section 30, judgment is carried out as to whether or not the Vck signal is at a high level upon restart up (S8). Here, when the Vck signal is at a high level, the main power supply control section 30 stops the output of start-up pulse by the main power supply control circuit 36 is stopped (S11) without performing initialization and ends the request for start up.

On the other hand, when the Vck signal is not at a high level, the main power supply control section 30 stands by for 50 ms to wait for a rise of the main power (S9). Next, after confirming the rise of the main power, the main power supply control section 30 outputs at the rising timing a $\overline{PS4}$ not matched with the pattern of the request for low power consumption so as to cancel the request for low power consumption. As a result, in the main power control section 30, a high level $\overline{PS}$ is produced and the main power supply circuit 60 is brought into operation.

Here, after enforcement of the initialization (S10), the main power supply control section 30 stops the output of the start-up pulse by the main power supply control circuit 36 (S11) and ends the request for start up.

Figure 13:
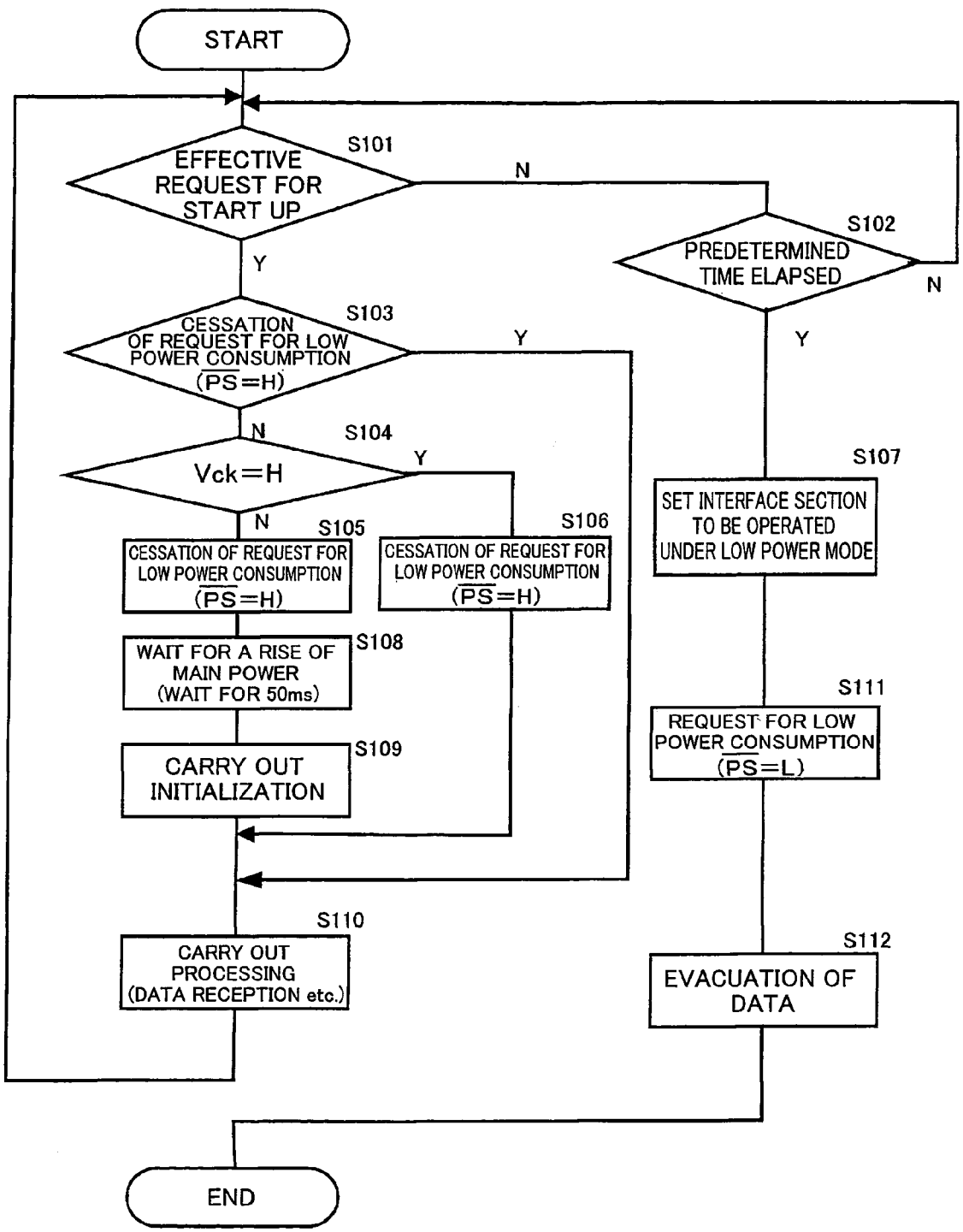
FIG. 13 is a flow chart showing operation procedure of the main control circuit for turning into the general operation mode from the low power operation mode, and operation for turning into the low power operation mode from the general operation mode.

FIG. 13 is a flow chart showing operation procedure of the main control circuit for turning into the general operation mode from the low power operation mode, and operation for turning into the low power operation mode from the general operation mode. The main control circuit 10 supplied power from the main power supply circuit 60 is suspended until an effective request for start up is made (S101).

When an effective request for start-up is made in the suspension step S101, the main control circuit 10 judges whether or not the request for low power consumption is cancelled (voided) (S103). In this step, the main control circuit 10 checks whether or not the output $\overline{PS}$ signal is at a high level.

If the judgment step S103 confirms that the main control circuit 10 outputs a high level $\overline{PS}$ signal, it indicates that the main power supply circuit 60 is already turned on, thus the main control circuit 10 enforces the required processing (S110). Thereafter, the sequence goes to the step S101.

On the other hand, when the judgment step S103 finds that the main control circuit 10 outputs a low level $\overline{PS}$ signal (i.e., the $\overline{PS}$ signal is not at a high level), the main control circuit 10 judges whether or not the Vck signal is at a high level (S104).

When the judgment in step S104 finds that the Vck signal is at a high level, the main control circuit 10 outputs a high level $\overline{PS}$ to the main power supply control section 30 so as to stop the request for low power consumption (S106). In this example, the main control circuit 10 outputs a $\overline{PS4}$ not matched with the pattern of the request for low power consumption so that a MPS-ON signal is outputted from the main power supply control section 30 to the main power supply circuit 60. As a result, the main control circuit 10 does not carry out initialization, and the output of start-up pulse by the main power supply start up circuit 36 is stopped (S110), thus enforcing the processing of the request for start up. Thereafter, the sequence goes to the step S101.

Meanwhile, when the judgment in step S104 finds that the Vck signal is not at a high level, the main control circuit 10 outputs a high level $\overline{PS}$ to the main power supply control section 30 so as to stop the request for low power consumption (S105). Then, the main control circuit 10 stands by for 50 ms to wait for a rise of the main power (S108), before carrying out initialization (S109). Then, the main control circuit 10 enforces the processing of the request for start up (S110). Thereafter, the sequence goes to the step S101.

When an effective request for start up is not made in the suspension step S101, the main control circuit 10 judges whether or not a predetermined time elapsed (S102). When the predetermined time has not elapsed, the sequence goes to the step S101.

On the other hand, when the predetermined time has elapsed, the main control circuit 10 sets the interface section 20 to be operated under the low power mode, thus stopping the operation of the interface section 20 (S107).

Then, the main control circuit 10 makes a request for low power consumption with respect to the main power supply control section 30 (S111). Further, the main control circuit 10 evacuates (stores) the data into a non-volatile memory 11 immediately after the request for low power consumption (S112). Note that, in the present example, the data evacuated into the non-volatile memory 11 contains information regarding setting condition of the FAX mode, the printer mode etc. When the evacuation of the data is completed, the main control circuit 10 finishes the operation.

Figure 14:
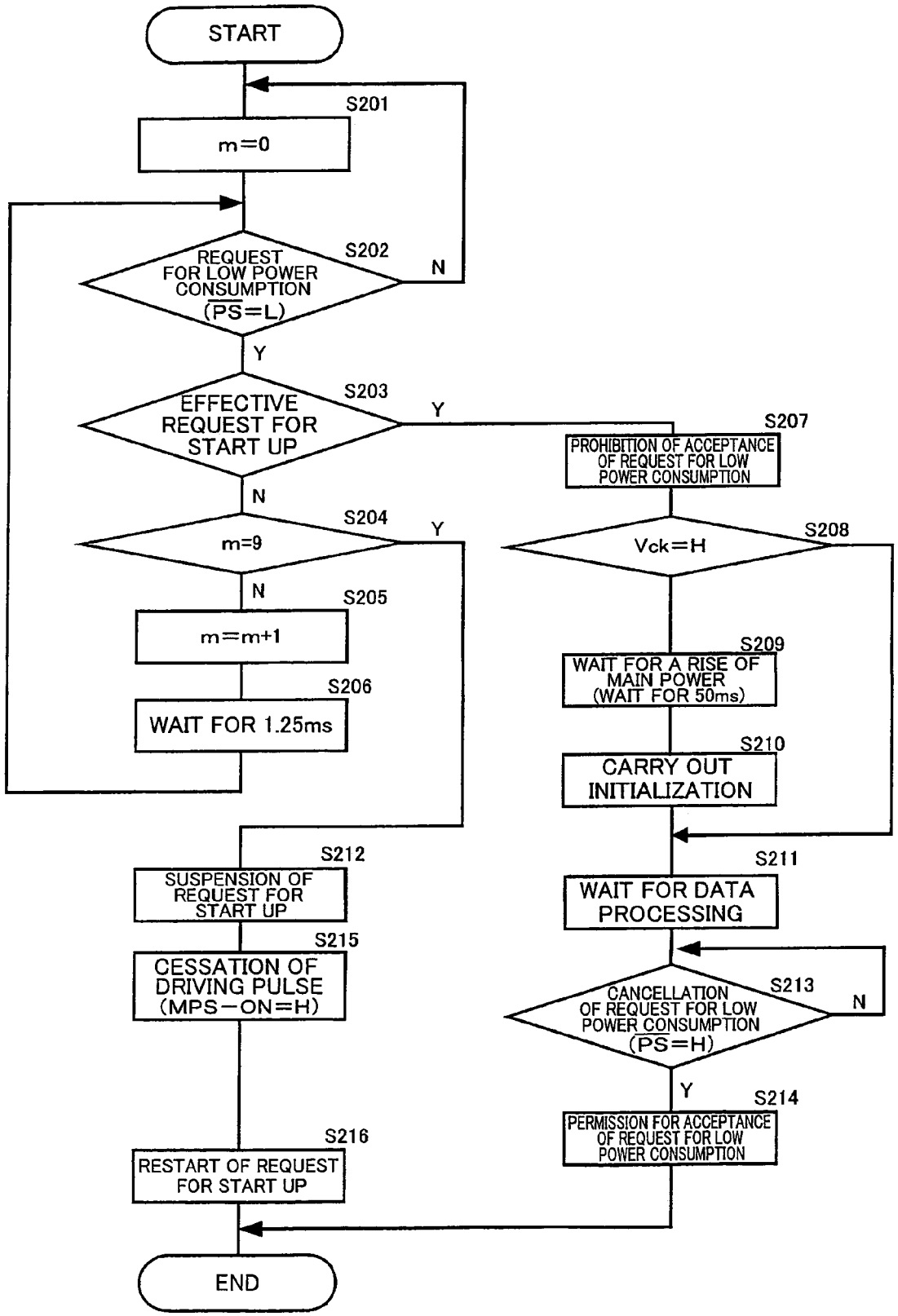
FIG. 14 is a flow chart showing operation procedure of the main power supply control section to turn the main control circuit into the low power operation mode from the general operation mode.

FIG. 14 is a flow chart of operation procedure of the main power supply control section 30 when a request for low power consumption is made when power is supplied from the main power supply circuit 60 to the main control circuit 10 (the general operation mode).

Before the request for low power consumption is made, the main power supply control section 30 resets the counting value m to 0 (S201). Then, the main power supply control section 30 stands by until the request for low power consumption is made (S202). In this step S202, the main power supply control section 30 stands by until a predetermined $\overline{PS4}$ matched with the pattern of the request for low power consumption is supplied to the main power supply control section 30.

When an effective request for low power consumption ($\overline{PS4}$) is supplied to the main power supply control section 30 in the suspension step S202, the main power supply control section 30 carries out detection (judgment) as to whether or not there is any effective request for start up, before the request for low power consumption is enforced (S203).

When an effective request for start-up is not made in the detection step S203, the main power supply control section 30 judges whether or not the counting value m has reached 9 (S204). When the main power supply control section 30 judges in step S3 that the counting value m is less than 9, the counting value m is incremented by 1 (S205), and the condition is suspended for 1.25 ms (S206), before another judgment is carried out as to whether or not the request for low power consumption continues. (S202). More specifically, through the steps S204→S205→S206→S202 and S201, the main power supply control section 30 performs confirmation as to if the supplied 4-bit $\overline{PS4}$ fails to match the pattern of the request for low power consumption, for example, because of cancellation of the request for low power consumption by the control circuit 10 before the request for low power consumption continues for 10 ms.

When the judgment step S204 finds that the counting value m has already reached 9, the main power supply control section 30 suspends the request for start up (S212). Then, in order to stop the main power supply circuit 60, the main power supply control section 30 modifies the low level MPS-ON signal to a high level MPS-OFF (S215). Then, without waiting for a complete fall of the main power supply circuit 60, the main power supply control section 30 carries out the step S216. Note that, in the present example, it takes about 100 ms before the main power completely fell. Further, if there is any effective request for start up after suspension of the request for step-up of S212, the main power supply control section 30 cancels the suspension to validate the request for start up (S216), and then stops the operation.

When the foregoing effective step up request detecting step S203 finds an effective step up request after the request for low power consumption is made, the main power supply control section 30 prohibits the acceptance of the request for low power consumption to avoid unwanted change into the low power mode (S207).

Then, the main power supply control section 30 judges whether or not the Vck signal is at a high level (S208). If the Vck signal is at a high level, the main power supply control section 30 immediately enforces the processing regarding the request for start up without performing initialization, and then stands by until the data evacuation is carried out before the main control circuit 10 is turned into the low power operation mode (S211).

On the other hand, if the step S208 finds that the Vck signal is not at a high level, the main power supply control section 30 first stands by for 50 ms to wait for a rise of the main power (S209). Then, the main power supply control section 30 carries out initialization (S210), and then the data processing regarding the request for start up. The condition is suspended until the processing is ended (S211).

Next, the main control circuit 10, that has made the request for low power consumption, suspends the operation until the request is cancelled (S213).

Then, after the main control circuit 10 confirms the cancellation of the request for low power consumption, the "prohibition of acceptance of request for low power consumption", that has been set in the step S207, is cancelled to accept request for low power consumption (S214).

The image forming device of the present invention comprises: a main control section that controls operation state of the device and outputs a request for low power consumption to change the operation state from a general operation mode to a low power operation mode; an interface section for controlling external communication with a detection circuit for detecting presence or absence of an external signal supplied to the main control section; a main power supply circuit for supplying power to the main control section only at operation under the general operation mode; a power supply control circuit for causing the main power supply circuit to be operated under a low power operation mode in response to the request for low power consumption supplied from the main control section; and a low power mode prohibition circuit for outputting a low power mode prohibition signal for voiding the request for low power consumption with respect to the power supply control circuit or the main power supply circuit while the external signal is supplied to the signal detection circuit.

In this structure, while communication is performed via a signal detection circuit, the request for low power consumption outputted from the main control section to the power supply control circuit is voided by the low power mode prohibition circuit. The voiding here means cessation of transition of the main power supply circuit and the auxiliary power circuit into the low power operation mode even when the request for low power consumption is outputted from the main control section.

Therefore, it is possible to prevent the device from being carelessly turned into the low power operation mode during the communication with external devices. Further, since the structure performs detection of signals and voiding of request for low power consumption by hardware, that are practical circuits, the voiding of the request for low power consumption is more securely and more quickly performed compared to the structure performing such a control with software.

Further, in addition to the foregoing arrangement, the image forming device of the present invention may be arranged so that: the main control section cancels or suspends the request for low power consumption that is being outputted or is ready to be outputted, while the low power mode prohibition signal is supplied to the power supply control circuit.

In this structure, the main control section does not carry out output of the request for low power consumption when the low power mode prohibition circuit activates voiding of the request for low power consumption. In this case, the main control section cancels or suspends the request for low power consumption that is being outputted or is ready to be outputted. Therefore it is possible to prevent the main control section from outputting unnecessary signals. Further, in this structure, the low power mode prohibition circuit is not required to keep outputting the low power mode prohibition signals.

In addition to the foregoing arrangement, the image forming device of the present invention may be arranged so that: the power supply control circuit outputs a start-up request signal to the main power supply circuit in response to receipt of the power prohibition signal, so as to bring back the operation state from a low power operation mode to a general operation mode.

In this structure, the power supply control circuit outputs a start-up request signal to the main power supply circuit in response to receipt of the power prohibition signal. This start-up request signal functions to cause the main power supply circuit to be operated under the general operation mode, and as long as this signal is supplied to the main power supply circuit, the main power supply circuit will not be turned into the low power operation mode. With this arrangement, it is not necessary to provide a new signal line between the power supply control circuit and the main power supply circuit, thereby simplifying the structure of the device.

In addition to the foregoing arrangement, the image forming device of the present invention may be arranged so that: the low power mode prohibition circuit immediately outputs the low power mode prohibition signal when the signal detection circuit detects an external signal.

In this structure, when the signal detection circuit detects an external signal, the low power mode prohibition circuit immediately outputs the low power mode prohibition signal without analysis of the content of the signal. Therefore, it is possible to prevent such a defect that the device is turned into the low power operation mode during the analysis of the signal.

In addition to the foregoing arrangement, the image forming device of the present invention may be arranged so that: the low power mode prohibition circuit cancels output of the low power mode prohibition signal when a predetermined time is elapsed after enforcement of communication via the interface section.

In this structure, the low power mode prohibition circuit keeps outputting the low power mode prohibition signal within the predetermined time after enforcement of communication via the interface section, and cancels the output when a predetermined time is elapsed. With this arrangement, it is possible to stop the low power mode prohibition signal at an appropriate timing even when the completion of the job is not informed. Therefore, it is possible to prevent endless output of the low power mode prohibition signal.

Further, the described power supply device 1 is not necessarily mounted to the MFP 100, but may be mounted to any electric devices driven by power from a power supply circuit.

The power supply control device of the present invention may be a power supply control device that stops a power supply circuit of an object device when the object device is operated under a low power operation mode, and starts up the power supply circuit when the object device is operated under a general operation mode, the power supply control device comprising: a power supply start-up circuit for outputting a start-up signal for starting up the power supply circuit so as to turn the object device from the low power operation mode to the general operation mode; and a power supply control section for judging whether or not an absolute value of the parameter denoting a characteristic of an electric signal outputted from the power supply circuit is at or greater than a predetermined value, during output of the start-up signal; when the absolute value is less than the predetermined value, the power supply control section carrying out initialization of the power supply circuit and then causing the power supply start-up circuit to stop the output of the start-up signal; when the absolute value is at or greater than the predetermined value, the power supply control section causing the power supply start-up circuit to stop the output of the start-up signal without the initialization of the power supply circuit.

The foregoing power supply control device is preferably arranged so that: the parameter is one of a voltage value, a current value, or a power value of the electric signal.

The foregoing power supply control device may be arranged so that: when the absolute value is less than the predetermined value, the power supply control section stands by for a predetermined time before carrying out the initialization of the power supply circuit.

The foregoing power supply control device may be arranged so that: the main control circuit outputs a start-up request signal to the power supply control section so as to turn the object device from the low power operation mode to the general operation mode; and the power supply control section causes the power supply start up circuit to output the start-up signal in response to input of the start-up request signal.

The foregoing power supply control device may be arranged so that: the main control circuit outputs a low power mode request signal to the power supply control section so as to turn the object device from the general operation mode to the low power operation mode; and the power supply control section causes the power supply start up circuit to output the cessation signal for stopping the power supply circuit in response to input of the low power mode request signal.

The foregoing power supply control device may be arranged so that: the power supply control section prohibits input of the low power mode request signal while the start-up signal is outputted from the power supply start up circuit.

The foregoing power supply control device is preferably arranged so that: the object device is an image forming device.

The image forming device of the present invention may be an image forming device that stops a power supply circuit provided therein when the device is operated under a low power operation mode, and starts up the power supply circuit when the device is operated under a general operation mode, the image forming device comprising: a power supply start-up circuit for outputting a start-up signal for starting up the power supply circuit so as to turn the object device from the low power operation mode to the general operation mode; and a power supply control section for judging whether or not an absolute value of the parameter denoting a characteristic of an electric signal outputted from the power supply circuit is at or greater than a predetermined value, during output of the start-up signal; when the absolute value is less than the predetermined value, the power supply control section carrying out initialization of the power supply circuit and then causing the power supply start-up circuit to stop the output of the start-up signal; when the absolute value is at or greater than the predetermined value, the power supply control section causing the power supply start-up circuit to stop the output of the start-up signal without the initialization of the power supply circuit.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image forming device, comprising:

a main control section that controls an operation state of the image forming device and outputs a request for low power consumption to change the operation state from a general operation mode to a low power operation mode;

an interface section for controlling external communication with a detection circuit for detecting presence or absence of an external signal supplied to the main control section;

a main power supply circuit for supplying power to the main control section only at the operation state under the general operation mode;

a power supply control circuit for causing the main power supply circuit to be operated under a low power operation mode in response to the request for low power consumption supplied from the main control section;

a low power mode prohibition circuit for outputting a low power mode prohibition signal for voiding the request for low power consumption with respect to the power supply control circuit or the main power supply circuit while the external signal is supplied to the signal detection circuit; and an auxiliary power supply circuit for constantly supplying power to the interface section and the power supply control circuit to allow transition from the low power operation mode to the general operation mode when the external signal is supplied to the signal detection circuit.

2. The image forming device as set forth in claim 1, wherein:

the main control section cancels or suspends the request for low power consumption that is being outputted or is ready to be outputted, while the low power mode prohibition signal is supplied to the power supply control circuit.

3. The image forming device as set forth in claim 1, wherein:

the power supply control circuit outputs a start-up request signal to the main power supply circuit in response to receipt of the power prohibition signal, so as to bring back the operation state from a low power operation mode to a general operation mode.

4. The image forming device as set forth in claim 1, wherein:

the low power mode prohibition circuit immediately outputs the low power mode prohibition signal when the signal detection circuit detects an external signal.

5. The image forming device as set forth in claim 1, wherein:

the low power mode prohibition circuit cancels output of the low power mode prohibition signal when a predetermined time is elapsed after enforcement of communication via the interface section.

* * * * *